(12) United States Patent
Jung et al.

(10) Patent No.: US 8,447,171 B2
(45) Date of Patent: May 21, 2013

(54) STORAGE MEDIUM FOR STORING TEXT-BASED SUBTITLE DATA INCLUDING STYLE INFORMATION, AND REPRODUCING APPARATUS AND METHOD FOR REPRODUCING TEXT-BASED SUBTITLE DATA INCLUDING STYLE INFORMATION

(75) Inventors: Kil-soo Jung, Hwaseong-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1287 days.

(21) Appl. No.: 12/190,645

(22) Filed: Aug. 13, 2008

(65) Prior Publication Data
US 2008/0298775 A1    Dec. 4, 2008

Related U.S. Application Data

(63) Continuation of application No. 11/060,595, filed on Feb. 18, 2005, now Pat. No. 8,195,036.

(30) Foreign Application Priority Data

Feb. 21, 2004  (KR) .................................. 2004-11699

(51) Int. Cl.
| | | |
|---|---|---|
| H04N 5/78 | (2006.01) | |
| H04N 5/45 | (2011.01) | |
| H04N 5/50 | (2006.01) | |
| H04N 5/76 | (2006.01) | |
| H04N 5/84 | (2006.01) | |
| H04N 5/92 | (2006.01) | |
| H04N 5/93 | (2006.01) | |
| H04N 5/262 | (2006.01) | |
| H04N 5/445 | (2011.01) | |
| H04N 5/928 | (2006.01) | |
| H04N 9/74 | (2006.01) | |
| H04N 9/80 | (2006.01) | |
| G06F 3/00 | (2006.01) | |
| G06F 17/21 | (2006.01) | |
| G10L 11/00 | (2006.01) | |
| G10L 13/08 | (2006.01) | |
| G10L 21/06 | (2006.01) | |
| G11B 5/09 | (2006.01) | |
| G11B 7/24 | (2006.01) | |
| G11B 20/12 | (2006.01) | |
| G11B 31/00 | (2006.01) | |

(52) U.S. Cl.
USPC ........... 386/324; 386/240; 386/241; 386/280; 386/281; 386/293; 386/326; 386/327; 386/334; 386/338; 386/340; 348/239; 348/564; 348/565; 348/569; 348/589; 360/32; 360/48; 369/47.16; 369/47.21; 369/47.27; 369/59.25; 369/275.3; 704/260; 704/270; 704/271; 715/236; 715/243; 715/248; 715/250; 715/253; 715/255; 715/724

(58) Field of Classification Search
USPC ................. 386/324, 280, 281, 293, 334, 338, 386/340, 240, 241, 326, 327; 348/239, 564, 348/565, 569, 589; 360/32, 48; 369/47.16, 369/47.21, 47.27, 59.25, 70, 275.3, 275; 704/260, 270, 271; 715/236, 243, 248, 250, 715/253, 255, 724
See application file for complete search history.

(56) References Cited

U.S. PATENT DOCUMENTS

| | | | | |
|---|---|---|---|---|
| 6,046,778 | A * | 4/2000 | Nonomura et al. | ........... 348/565 |
| 6,275,457 | B1 | 8/2001 | Maeda | |
| 6,288,990 | B1 * | 9/2001 | Fujiie et al. | ............... 369/47.21 |
| 6,418,424 | B1 * | 7/2002 | Hoffberg et al. | ............... 706/21 |
| 6,829,429 | B1 * | 12/2004 | Kitahashi et al. | ............. 386/241 |
| 6,901,207 | B1 * | 5/2005 | Watkins | ........................ 386/314 |
| 7,729,595 | B2 * | 6/2010 | Kim et al. | ..................... 386/241 |
| 7,757,165 | B1 * | 7/2010 | Stuple et al. | .................. 715/236 |
| 7,965,921 | B2 * | 6/2011 | Chung et al. | .................. 386/240 |
| 2003/0012558 | A1 * | 1/2003 | Kim et al. | ..................... 386/97 |
| 2004/0168203 | A1 * | 8/2004 | Seo et al. | ....................... 725/135 |
| 2005/0007469 | A1 * | 1/2005 | Imamura et al. | ............. 348/239 |
| 2005/0078947 | A1 * | 4/2005 | Chung et al. | .................... 386/95 |
| 2005/0105890 | A1 * | 5/2005 | Chung et al. | .................... 386/95 |
| 2005/0196148 | A1 | 9/2005 | Seo et al. | |
| 2005/0198071 | A1 * | 9/2005 | Yoo et al. | .................. 707/104.1 |

FOREIGN PATENT DOCUMENTS

| CN | 1914912 | 2/2007 |
|---|---|---|
| EP | 0 791 925 A2 | 8/1997 |
| JP | 2003-173621 A | 6/2003 |
| JP | 2007-522595 A | 8/2007 |
| KR | 2005-45253 | 5/2005 |
| WO | WO 2005/034122 | 4/2005 |
| WO | WO 2005/076609 | 8/2005 |
| WO | WO 2005/076633 | 8/2005 |

OTHER PUBLICATIONS

Japanese Office Action issued on Feb. 1, 2011, in counterpart Japanese Application No. 2006-554031 (10 pages, in Japanese, including complete English translation of substantive portion of Japanese Office Action).
Communication issued the European Patent Office on Mar. 23, 2009.
Office Action issued by The State Intellectual Property Office of the People's Republic of China on Mar. 27, 2009.
Patent Abstract of Japanese No. 2001-135066.
Search Report issued in European Patent Application No. 05726919.3 on Sep. 11, 2007.
Microsoft Corporation, "Understanding SAMI 1.0", Published Oct. 2001—updated Feb. 2003, pp. 1-11.
Blu-ray Disc, "White paper Blu-ray Disc Format", Aug. 2004, pp. 1-35.
Office Action issued in Korean Patent Application No. 2004-11699 on Dec. 1, 2006.
U.S. Appl. No. 11/060,595, filed Feb. 18, 2005, Kil-soo Jung et al., Samsung Electronics Co., Ltd.
U.S. Appl. No. 12/190,636, filed Aug. 13, 2008, Kil-soo Jung et al., Samsung Electronics Co., Ltd.
U.S. Appl. No. 12/190,641, filed Aug. 13, 2008, Kil-soo Jung et al., Samsung Electronics Co., Ltd.
U.S. Appl. No. 12/190,652, filed Aug. 13, 2008, Kil-soo Jung et al., Samsung Electronics Co., Ltd.
U.S. Appl. No. 12/190,660, filed Aug. 13, 2008, Kil-soo Jung et al., Samsung Electronics Co., Ltd.
Indonesian Office Action issued on Jul. 12, 2011, in counterpart Indonesian Patent Application No. W00200902755 (2 pages).
Indonesian Office Action issued on Jul. 12, 2011, in counterpart Indonesian Patent Application No. W00200902756 (2 pages).
Result of Consultation dated Feb. 28, 2012, in counterpart European Patent Application No. 08156475.9 (in English).
"Digital Video Broadcasting (DVB); Subtitling systems," Final draft ETSI EN 300 743 V1.2.1 (Jun. 2002), European Standard (Telecommunications series), pp. 1-48 (XP14001876).
"NCAM Rich Media Accessibility: Adding a Caption Track in QuickTime," *National Center for Accessible Media*, Dec. 5, 2003, http://ncam.wgbh.org/richmedia/tutorials/qtcapshowto.html. Web. Apr. 30, 2012.
Summons to attend oral proceedings pursuant to Rule 115(1) EPC dated Sep. 30, 2011, in counterpart European Application No. 08156475.9 (7 pages).
"HTML 4.01 Specification", W3C Recommendation, Dec. 24, 1999, Retrieved from Internet, Web URL: http://www.w3.org/TR/html401/. (14 pages).
European Examination Report issued Aug. 30, 2012 in counterpart European Patent Application No. 08156475.9 (5 pages, in English).

\* cited by examiner

*Primary Examiner* — Thai Tran
*Assistant Examiner* — Syed Hasan
(74) *Attorney, Agent, or Firm* — NSIP Law (57) ABSTRACT

A storage medium for storing text-based subtitle data including style information, a reproducing apparatus and methods are provided for reproducing text-based subtitle data including style information separately recorded on the storage medium. The storage medium includes: multimedia image data; and text-based subtitle data for displaying subtitles on an image based on the multimedia image data, wherein the text-based subtitle data includes dialog information indicating subtitle contents to be displayed on the image, style information indicating an output style of the dialog information, and partial style information indicating an output style applied to a portion of the dialog information. Accordingly, subtitles can be provided in a plurality of languages without limited to the number of units of subtitle data. In addition, subtitle data can be easily produced and edited. Likewise, an output style of the subtitle data can be changed in a variety of ways. Also, a special style can be applied in order to emphasize a portion of the subtitles.

3 Claims, 10 Drawing Sheets

STORAGE MEDIUM FOR STORING TEXT-BASED SUBTITLE DATA INCLUDING STYLE INFORMATION, AND REPRODUCING APPARATUS AND METHOD FOR REPRODUCING TEXT-BASED SUBTITLE DATA INCLUDING STYLE INFORMATION

CROSS-REFERENCE TO RELATED APPLICATIONS

This application is a continuation of U.S. patent application Ser. No. 11/060,595 filed on Feb. 18, 2005, now U.S. Pat. No. 8,195,036, which claims all benefit of Korean Patent Application No. 2004-11699, filed on Feb. 21, 2004, in the Korean Intellectual Property Office, the disclosures of which are incorporated herein by reference.

BACKGROUND OF THE INVENTION

1. Field of the Invention

The present invention relates to reproduction of a multimedia image, and more particularly, to a storage medium for recording text-based subtitle data including style information, and a reproducing apparatus and method for reproducing text-based subtitle data including style information recorded on the storage medium.

2. Related Art

Recently, a video stream, an audio stream, a presentation graphics stream for providing subtitle data, and an interactive graphics stream for providing buttons or menus to interact with a user are multiplexed in a moving picture main stream (also known as an audio-visual "AV" data stream) recorded on a storage medium for providing a high definition (HD) multimedia image having high image quality. In particular, the presentation graphics stream for providing subtitle data also provides a bitmap-based image in order to display subtitles or captions on an image.

However, bitmap-based subtitle data has a large size and is multiplexed with other data streams. As a result, in order to guarantee a maximum bit transmission rate required by a specific application, the number of units of the subtitle data, which can be included in a multiplexed main stream, is limited. In particular, when multi-lingual subtitles are provided, problems relating to a limited number of units of subtitle data may occur.

Also, due to the bitmap-based image, production of the subtitle data and edition of the produced subtitle data are very difficult. This is because such subtitle data is multiplexed with other data streams such as video, audio and interactive graphics streams. Moreover, an output style of the subtitle data cannot be changed in a variety of ways easily, that is, to change one output style into another output style of the subtitle data.

SUMMARY OF THE INVENTION

Aspects of the present invention advantageously provide a storage medium in which text-based subtitle data including style information is recorded, and a reproducing apparatus and method for reproducing text-based subtitle data including style information recorded on such a storage medium.

According to an aspect of the present invention, a storage medium comprises: multimedia image data; and text-based subtitle data for displaying subtitles on an image based on the multimedia image data, wherein the text-based subtitle data includes dialog information indicating subtitle contents to be displayed on the image, style information indicating an output style of the dialog information, and partial style information indicating an output style applied to a portion of the dialog information.

The dialog information may include text information regarding the subtitle contents to be displayed on the image, and time information regarding the time when the text information is output to a screen and displayed on the image.

The style information may include area information indicating a position at which the text information is output on the image and font information regarding the type, size, color, thickness, and style of an output font. The text-based subtitle data may include at least one unit of style sheet information that is an output style group consisting of a plurality of units of style information.

The partial style information may be output style information for emphasizing and displaying a portion of the text information, and has relative values with respect to the font size and/or the font color included in the style information. The partial style information may be included in the dialog information, or stored separately from the dialog information in which reference information of the partial style information is included.

The text-based subtitle data may also include, in addition to the style information, information on whether to include predetermined style information defined by a manufacturer of the storage medium.

According to another aspect of the present invention, an apparatus is provided for reproducing multimedia image data and text-based subtitle data separately recorded on a storage medium for displaying subtitles on an image based on the multimedia image data. Such an apparatus comprises: a buffer unit for storing style information indicating an output style of dialog information, which is subtitle contents to be displayed on the image, and partial style information indicating an output style applied to a portion of the dialog information; and a text subtitle processing unit for reading the style information and the partial style information from the buffer unit, for applying the read style information and partial style information to the dialog information, for converting the applied information to a bitmap image, and for outputting the converted bitmap image.

According to another aspect of the present invention, a method of reproducing multimedia image data and text-based subtitle data recorded on a storage medium for displaying subtitles on an image based on the multimedia image data, comprises: reading dialog information indicating subtitle contents to be displayed on the image, style information indicating an output style of the dialog information, and partial style information indicating an output style applied to a portion of the dialog information; converting the dialog information to a bitmap image to which the style and partial style are applied based on the style information and the partial style information; and outputting the converted bitmap image according to output time information included in the dialog information.

Additional aspects and/or advantages of the invention will be set forth in part in the description which follows and, in part, will be obvious from the description, or may be learned by practice of the invention.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE INVENTION

Hereinafter, the present invention will now be described more fully with reference to the accompanying drawings, in which example embodiments of the invention are shown.

Figure 1:
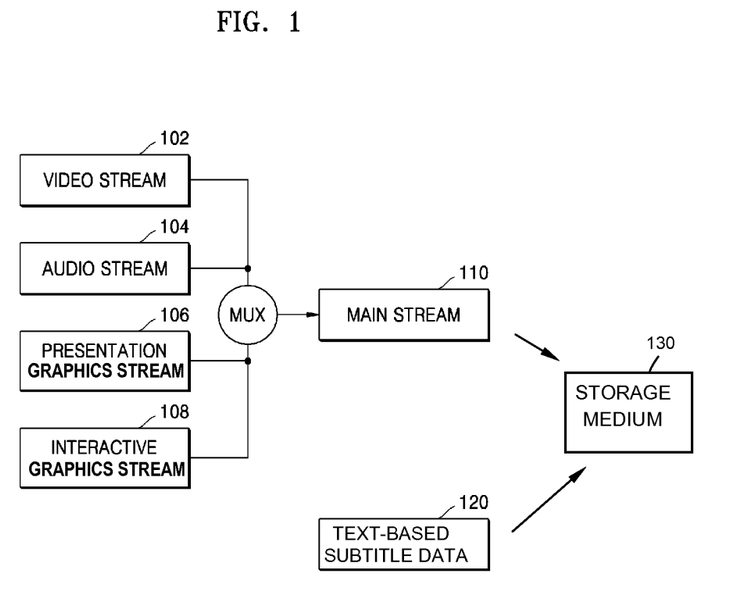
FIG. 1 illustrates an example data structure of a main stream, in which a multimedia image is encoded, and text-based subtitle data separately recorded on a storage medium according to an embodiment of the present invention.

FIG. 1 illustrates a data structure of a main stream 110, in which a multimedia image is encoded, and text-based subtitle data 120 separately recorded from the main stream 110 on a storage medium 130, such as a digital versatile disc (DVD) according to an embodiment of the present invention. The main stream 110 and the text-based subtitle data 120 can be obtained, separately or collectively, from one or more sources or data generators.

Referring to FIG. 1, the text-based subtitle data 120 is provided separately from the main stream 110 recorded on the storage medium 130 in order to resolve problems relating to bitmap-based subtitle data. The main stream 110, also known as an audio-visual (AV) data stream, includes a video stream 102, an audio stream 104, a presentation graphics stream 106, and an interactive graphics stream 108, all of which are multiplexed therein so as to be recorded on the storage medium 130. The text-based subtitle data 120 represents data for providing subtitles or captions of a multimedia image to be recorded on the storage medium 130, and can be implemented using a markup language, such as an extended markup language (XML), or using binary data. The presentation graphics stream 106 for providing subtitle data also provides bitmap-based subtitle data in order to display subtitles (or captions) on a screen.

Since the text-based subtitle data 120 is recorded separately from the main stream 110, and is not multiplexed with the main stream 110, the size of the text-based subtitle data 120 is not limited thereto. Likewise, the number of supported languages is not limited. As a result, subtitles or captions can be provided using a plurality of languages. Moreover, it is convenient to produce and edit the text-based subtitle data 120.

Figure 2:
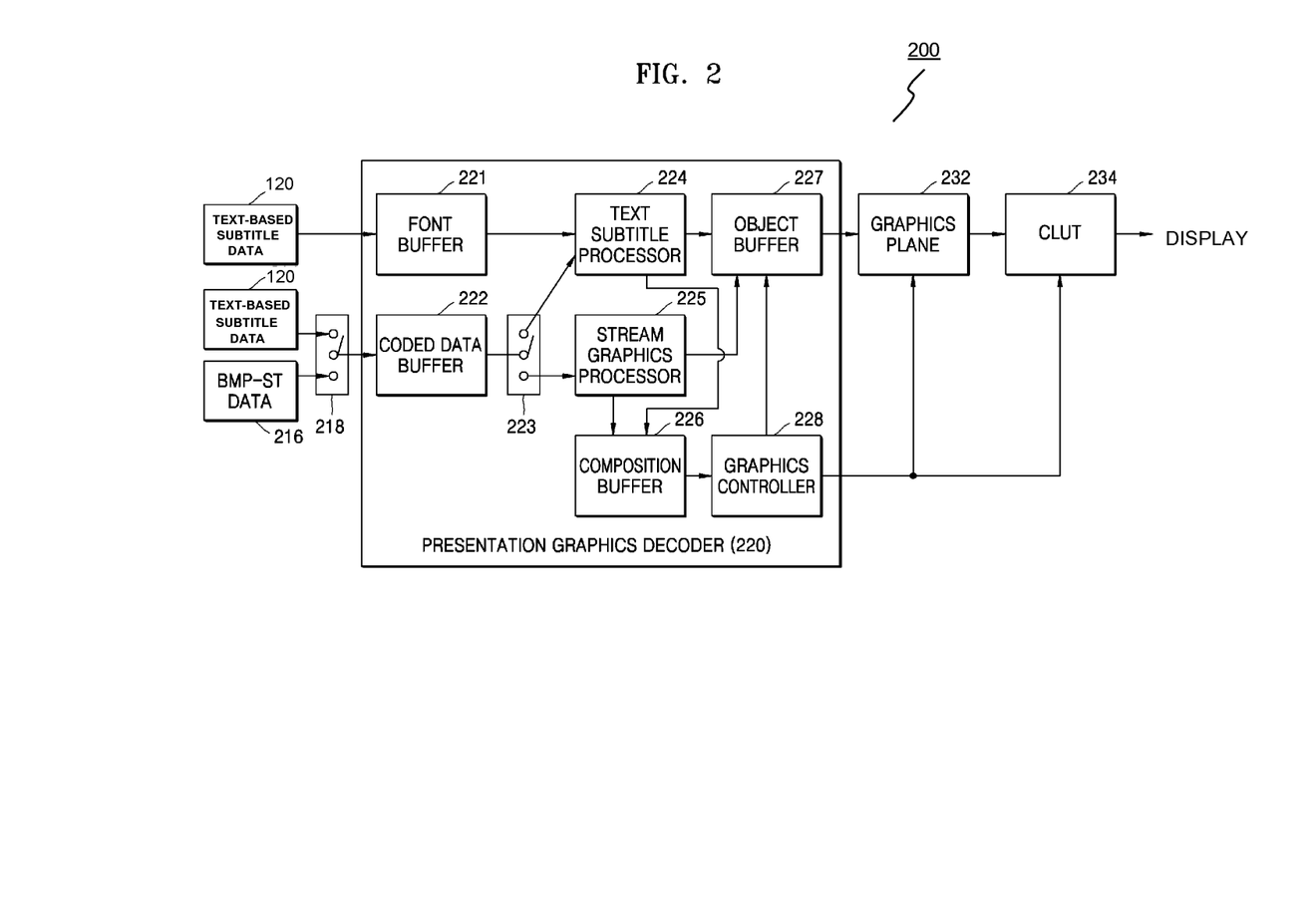
FIG. 2 is a block diagram of an example reproducing apparatus according to an embodiment of the present invention.

Turning now to FIG. 2, a block diagram of a reproducing apparatus for reproducing text-based subtitle data recorded on a storage medium according to an embodiment of the present invention is illustrated. As shown in FIG. 2, the reproducing apparatus 200, also known as a playback device, comprises a presentation graphics decoder 220, which can decode and reproduce all text-based subtitle data 120 and/or bitmap-based subtitle data 216, as an output, via a graphics plane 232 and a color look-up table (CLUT) 234.

The presentation graphics decoder 220 includes a font buffer 221 to store font data from the text-based subtitle data 120; a coded data buffer 222 to store data from either the text-based subtitle data 120 or the bitmap-based subtitle data 216 selected at switch 218; a switch 223; a text subtitle processor 224 to convert dialog information included in the text-based subtitle data 120 to bitmap graphics for storage in an object buffer 227; a stream graphics processor 225 to decode the bitmap-based subtitle data 216 and produce a bitmap image of subtitles for storage in the object buffer 227 and control information for storage in a composition buffer 226; and a graphics controller 228 to control an output of the bitmap image of the subtitles stored in the object buffer 227 based on the control information stored in the composition buffer 226.

In a case of the bitmap-based subtitle data 216, in the presentation graphics decoder 220, the stream graphics processor 225 decodes the bitmap-based subtitle data and transmits a bitmap image of subtitles to the object buffer 227 and control information of the subtitles to the composition buffer 226. Also, the graphics controller 228 controls an output of the bitmap image of the subtitles stored in the object buffer 227 based on the control information stored in the composition buffer 226. The output graphics image of the subtitles is formed on a graphics plane 232 and output on a screen by applying a color with reference to a color look-up table (CLUT) 234.

In a case of the text-based subtitle data 120, the text subtitle processor 224 converts dialog information of a text to bitmap graphics by referring to font data stored in a font buffer 221 and applying style information to be described later, and stores the converted bitmap graphics in the object buffer 227. Also, the text subtitle processor 224 transmits control information, such as output time information, to the composition buffer 226. Remaining procedures of processing bitmap-converted subtitles are the same as in the case of the bitmap-based subtitle data 216.

Figure 3:
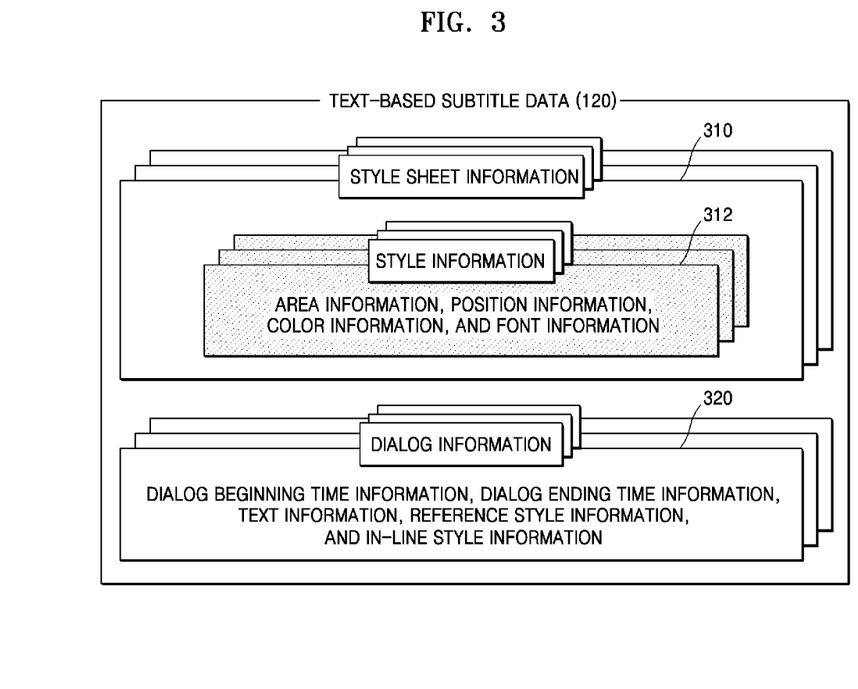
FIG. 3 illustrates an example data structure of text-based subtitle data according to an embodiment of the present invention.

A detailed structure of the text-based subtitle data 120 to be reproduced will now be described with reference to an example reproducing apparatus shown in FIG. 2. FIG. 3 illustrates a data structure of the text-based subtitle data 120 according to an embodiment of the present invention.

Referring to FIG. 3, the text-based subtitle data 120 includes style sheet information 310 and dialog information 320. A plurality of units of style sheet information 310 and/or dialog information 320 can be included in the text-based subtitle data 120.

For example, the style sheet information 310 includes a plurality of units of style information 312 indicating how to output text information on the screen. The style information 312 includes information on an output style such as area information indicating an output area of subtitles to be displayed on the screen, position information indicating a position of text subtitles within the output area, color information indicating a background color, and font information for designating a font type and a font size to be applied to the text subtitles etc.

The dialog information 320 includes text information to be displayed on the screen by being bitmap-converted, i.e., rendered, reference style information to be applied when rendering the text information, and speech (dialog) beginning and ending time information for designating the times when the subtitles (or captions) appear and disappear on the screen, respectively. In particular, the dialog information 320 includes in-line style information for emphasizing a portion of the text information of the subtitles by applying a new style thereto. The in-line style information preferably excludes the area information and the position information among the style information 312 applied to an entire text, and includes the font information and color information required to convert a portion of the text information to a bitmap image.

As shown in FIG. 3, the text-based subtitle data 120 comprises a plurality of units of style sheet information 310 and a plurality of units of dialog information 320. The style sheet information 310 is a set of the style information 312 to be applied to each of all the dialog information 320, and at least one unit of the style sheet information 310 must exist. The manufacturer may produce additional style sheet information 310 so that a user can change and select a style applied to the text information and let the additional style sheet information 310 be included in the text-based subtitle data 120. The additional style sheet information 312 to be selected by the user preferably includes only a plurality of units of font information and color information to be applied to the text information.

The dialog information 320 includes the text information containing subtitle contents to be output on the screen. A plurality of units of dialog information 320 may be included in the text-based subtitle data 120 in order to process all subtitles (captions) all over an entire multimedia image having high image quality. One unit of the dialog information 320 converts text information to be output on the speech beginning time to a bitmap image by referring to the reference style information and/or the in-line style information, and displays the converted bitmap image until the speech ending time.

Figure 4A:
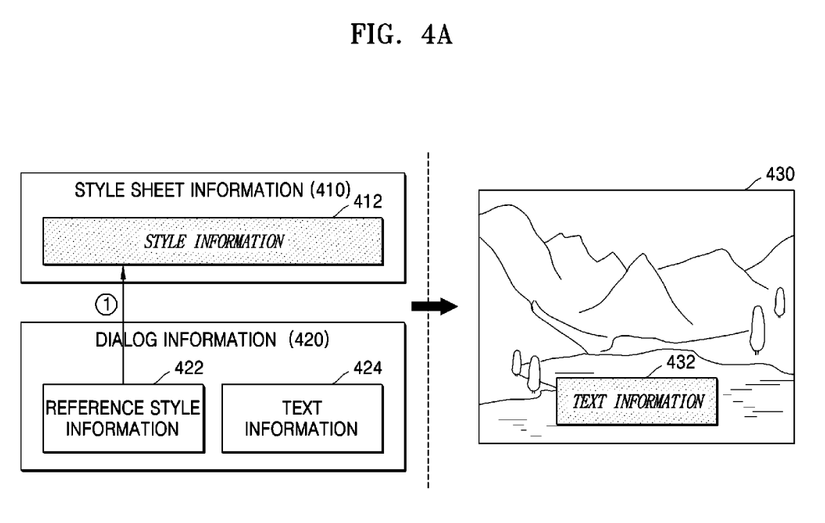
FIGS. 4A and 4B are examples of results of reproducing text-based subtitle data having the data structure shown in FIG. 3.
Figure 4B:
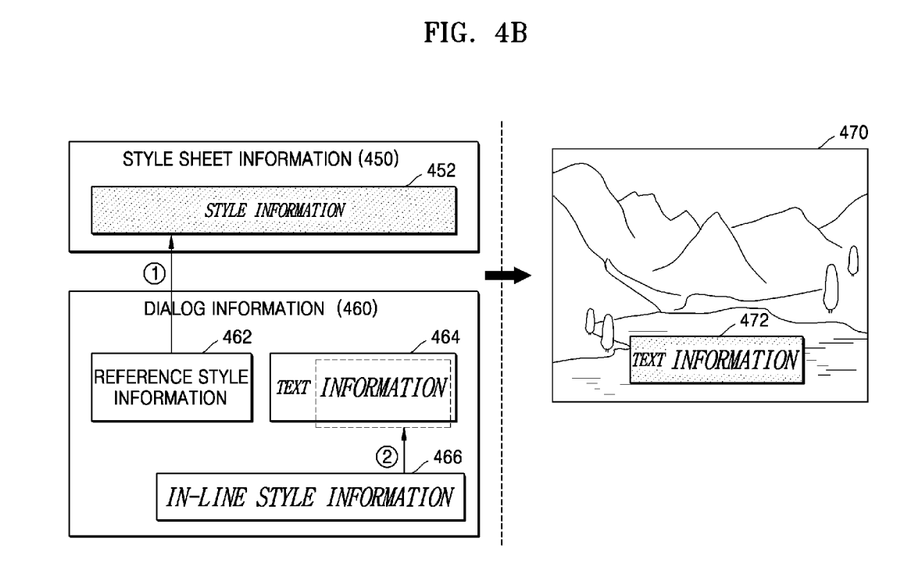

FIGS. 4A and 4B are examples of results of reproducing text-based subtitle data having the data structure shown in FIG. 3.

Referring to FIG. 4A, the text subtitle processor 224 of the reproducing apparatus 200, as shown in FIG. 2, reads style information 412, which is directed by reference style information 422 among a plurality of units of style information included in style sheet information 410, selected based on the reference style information 422 included in dialog information 420 to be reproduced in operation (1). The text subtitle processor 224 then converts text information 424 to a bitmap image by applying the read style information 412 to the text information 424, and outputs the converted bitmap image. The reproducing image result 430 is shown on the right of FIG. 4A. That is, when a multimedia image is output, a bitmap image of text information 432 for subtitles to which the style information 412 directed by the reference style information 422 is applied is output together for display on the screen.

FIG. 4B illustrates a reproducing image result of a case where style information and in-line style information, which is applied to a portion of text information, are applied during reproduction. Referring to FIG. 4B, the text subtitle processor 224 of the reproducing apparatus 200, as shown in FIG. 2, reads style information 452 directed by reference style information 462 in operation (1) and applies the read style information 452 to text information 464 for subtitles. Also, the text subtitle processor 224 reads in-line style information 466 in operation (2) and applies the read in-line style information 466 to a portion of the text information 464 for subtitles. That is, when the basic style information 452 included in style sheet information 450 and the in-line style information 466 defined in dialog information 460 are overlapped, the in-line style information 466 is reflected on a final output and displayed on the screen. In this manner, the text information 464 to which the style information 452 and the in-line style information 466 are applied is converted to a bitmap image and displayed on the screen. The reproducing image result 470 is shown on the right of FIG. 4B. A bitmap image of text information 472 for subtitles output with a multimedia image together is output by applying the style information 452 thereto and the in-line style information 466 to a portion thereof.

That is, when text-based subtitle data 120 is reproduced with a multimedia image having high image quality, the reproducing apparatus 200, as shown, for example, in FIG. 2, selects style sheet information to be applied in an initial reproduction of the text-based subtitle data 120 among a plurality of units of style sheet information stored on a storage medium. If additional information indicating style sheet information to be initially applied is included in the style sheet information, the reproducing apparatus 200, shown in FIG. 2, can select the style sheet information to be applied in the initial reproduction of the text-based subtitle data 120 with reference to the additional information. In other words, first defined style sheet information among the plurality of units of style sheet information can be selected. The selected style sheet information is applied to all of dialog information unless a style change request is generated by the user.

Figure 5:
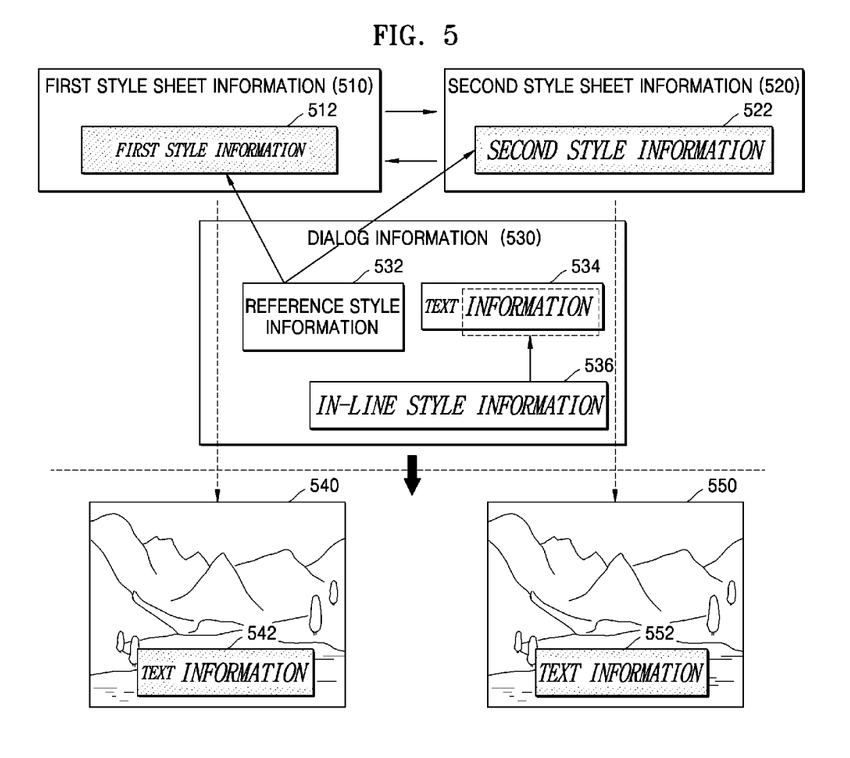
FIG. 5 illustrates a problem which can be generated when text-based subtitle data having the data structure shown in FIG. 3 is reproduced.

However, in a case where the manufacturer has produced a plurality of units of style sheet information and the user can select one of a plurality of styles, that is, in a case where the style change request is generated by the user, a problem may be generated. When the style change request is generated by the user, new style information included in new style sheet information is applied due to reference style information included in subsequently output dialog information. However, if the newly applied style information is equal to previous in-line style information, no change is generated in a portion of text information directed by the in-line style information. As a result, the original purpose that the manufacturer desired to emphasize a portion of the text information using the in-line style information cannot be realized. FIG. 5 illustrates a problem which can be generated when text-based subtitle data having the data structure shown in FIG. 3 is reproduced.

Referring to FIG. 5, a process of a case where a request of changing first style information 512 to second style information 522 is received by a user is illustrated. An image 540 on the bottom-left of FIG. 5 is shown a result output by applying the first style information 512 before the style change request is generated. That is, a result that in-line style information 536 is applied to a portion of the text information 534 after the first style information 512 directed by reference style information 532 is applied to entire text information 534 is shown. Accordingly, the first style information 512 is applied to entire subtitles, and the portion of the text information 534 is emphasized and displayed due to the in-line style information 536.

However, as shown on the bottom-right of FIG. 5, an image 550 displayed by newly applying the second style information 522 after the style change request is generated by the user shows that an original purpose of the manufacturer who desired to emphasize a portion of the text information using the in-line style information 536 is not achieved. This can be generated when the second style information 522 is equal to the in-line style information 536.

An example in-line style information to be incorporated into text-based subtitle data for resolving the problem as described in connection with FIG. 5 will now be described herein below.

Figure 6:
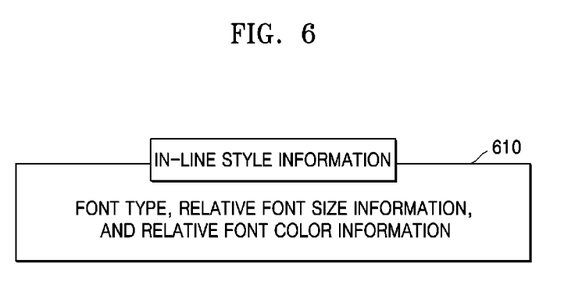
FIG. 6 illustrates an example in-line style information to be incorporated into text-based subtitle data for resolving the problem illustrated in FIG. 5 according to an embodiment of the present invention.

FIG. 6 illustrates an example in-line style information to be incorporated into text-based subtitle data for resolving the problem illustrated in FIG. 5 according to an embodiment of the present invention. Referring to FIG. 6, in-line style information 610 of the text-based subtitle data 120 includes a font type, relative font size information, and relative color information. In addition, the in-line style information 610 may also include information such as thickness and italics.

As described in connection with FIG. 6, since style sheet information includes only information on the size of the font and a color, an emphasis effect on the font type, the thickness, and the italics can be maintained even if the style sheet information is changed to new style sheet information by the user. However, in a case of the size of the font and the color, the problem described in FIG. 5 can be generated. Therefore, it is preferable that the in-line style information 610 includes relative font size information and relative color information so that relative values are applied based on currently applied font size and color values of basic style information without using absolute values for attribute values of font size and color information included in the in-line style information 610.

That is, by using relative attribute values for the font size and color, an emphasis effect due to the in-line style information 610 can be maintained even if the style sheet information is changed by the user. Here, it is preferable that the reproducing apparatus 200, as shown, for example, in FIG. 2, can reestablish the font size and color values to a realizable size and the minimum or maximum value of the color in a case where a relevant font is out of a range of the realizable size or color.

Figure 7:
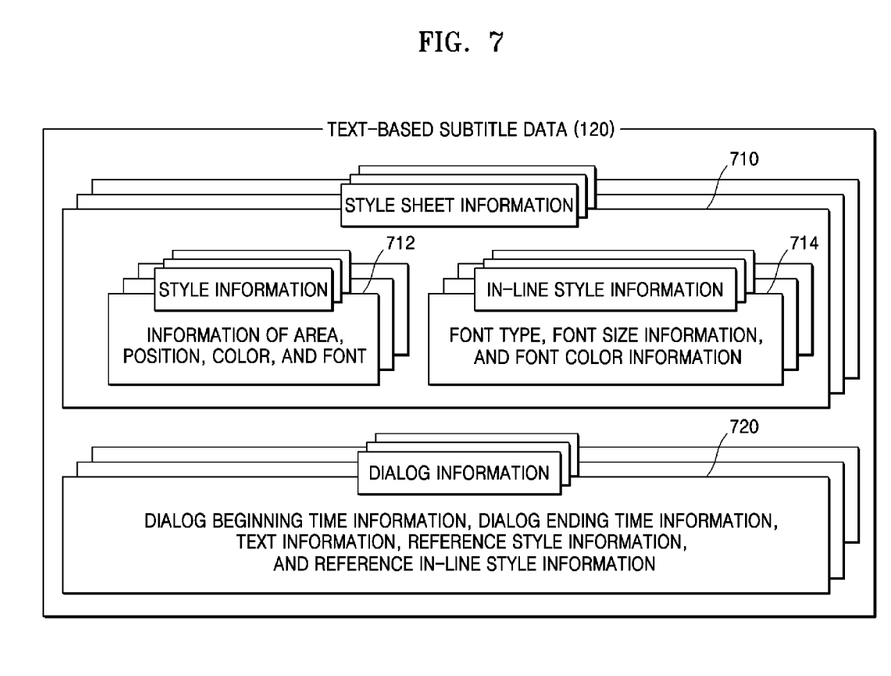
FIG. 7 illustrates an example data structure of text-based subtitle data incorporating in-line style information according to an embodiment of the present invention.

FIG. 7 illustrates an example data structure of text-based subtitle data according to another embodiment of the present invention. As shown in FIG. 7, the text-based subtitle data 120 comprises a plurality of units of style sheet information 710 and a plurality of dialog information 720.

In contrast to FIG. 3, in which the text-based subtitle data 120 is shown such that the in-line style information is included in the dialog information 320 separate from the style sheet information 310, the text-based subtitle data 120 is shown in FIG. 7, such that style sheet information 710 includes basic style information 712 and in-line style information 714 which can be applied to a portion of text information. In addition, dialog information 720 also includes reference in-line style information for referring to an identifier of the in-line style information 714 included in the style sheet information 710 in order to direct the in-line style information 714 to be applied to text information of a current dialog.

The in-line style information 714 included in the style sheet information 710 defines a font size and a color to show an emphasis effect based on the basic style information 712. Accordingly, even if the style sheet information 710 is changed by the user, by applying in-line style information 714 separately defined by the changed style sheet information, the manufacturer's intention to emphasize a portion of text information can advantageously be realized.

The in-line style information 714 follows an attribute of the basic style information 712 with respect to information on an area and position in which the portion of the text information is displayed, and can include font type, font size, and color information as rendering information to be used for emphasizing the portion of the text information.

As another example embodiment of the present invention, separately from the fact that the manufacturer defines style information to be applied to text information, the reproducing apparatus (or playback device), as shown, for example, in FIG. 2, for reproducing text-based subtitle data including style information recorded on a storage medium may set the style information to be applied to the text information at will. That is, a basic attribute follows style information included in the text-based subtitle data described above, and a portion of the style information, such as a font type, a font size, and a color, may be changed by the reproducing apparatus. In other words, the reproducing apparatus 200, as shown, for example, in FIG. 2, may output text information by rendering a different output style using built-in style information. Due to these functions of the reproducing apparatus 200, as shown in FIG. 2, an output format is different from a format set by the manufacturer in general.

Figure 8:
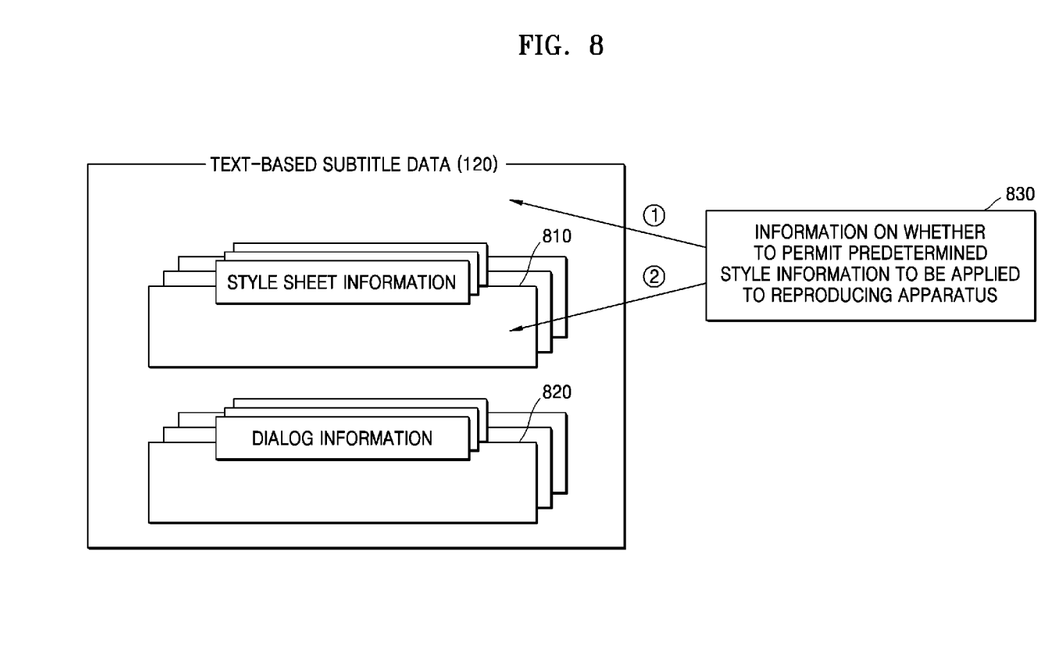
FIG. 8 illustrates an example data structure of text-based subtitle data to which a reproducing apparatus can apply predetermined style information according to another embodiment of the present invention.

A method for resolving this problem will now be described in detail. FIG. 8 illustrates an example data structure of text-based subtitle data to which a reproducing apparatus can apply predetermined style information according to another embodiment of the present invention.

Referring to FIG. 8, in order to resolve the problem that the reproducing apparatus 200, as shown, for example, in FIG. 2, applies style information to text information at will regardless of the intention of the manufacturer, the text-based subtitle data 120 further includes information 830 indicating whether to permit predetermined style information to be applied to the reproducing apparatus, as shown, for example, in FIG. 2. Such information 830 represents information indicating whether the manufacturer allows the predetermined style information to be applied to a reproducing apparatus 200, shown in FIG. 2. When the manufacturer allows the predetermined style information to be applied, text information can be output by applying the predetermined style information supported by the reproducing apparatus 200, shown in FIG. 2.

Using the information 830 indicating whether to permit the predetermined style information supported by the reproducing apparatus 200, shown in FIG. 2, the predetermined style information to be applied to all of style information included in the text-based subtitle data 120 can be determined by storing the information 830 separately from style sheet information 810 as shown in operation (1) of FIG. 8. Also, whether to permit the predetermined style information to be applied to only specific style information can be determined by storing the information 830 for each unit of the style sheet information 810 as shown in operation (2) of FIG. 8.

Figure 9:
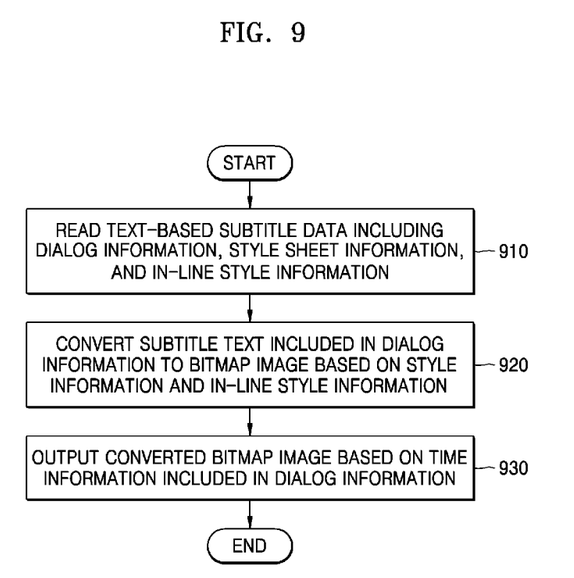
FIG. 9 is a flowchart illustrating a process of reproducing text-based subtitle data including style information according to an embodiment of the present invention.

A method of reproducing text-based subtitle data including style information will now be described based on an example data structure of text-based subtitle data recorded on a storage medium and an example reproducing apparatus, shown in FIG. 2. FIG. 9 is a flowchart illustrating a process of reproducing text-based subtitle data including style information according to an embodiment of the present invention.

Referring to FIG. 9, text-based subtitle data 120 including dialog information, style sheet information, and in-line style information, as shown, for example, in FIG. 3, or FIG. 7, is read from a storage medium in operation 910. In operation 920, style information is applied to a subtitle text included in the dialog information, the in-line style information is applied to a portion of the subtitle text, and the subtitle text is converted to a bitmap image. The converted bitmap image is output based on time information on which a speech (or caption) is output to a screen for a visual display, in operation 930.

As described from the foregoing, the present invention advantageously provides a storage medium, in which text-based subtitle data including a plurality of units of style information is recorded, and a reproducing apparatus and method therefor, such that subtitles can be provided in a plurality of languages without being limited to the number of units of subtitle data. As a result, subtitle data can be easily produced and edited, and an output style of the subtitle data can be changed in a variety of ways. Moreover, a special style can be applied in order to emphasize a portion of the subtitles.

Example embodiments of the present invention can also be written as computer programs and can be implemented in general-use digital computers that execute the programs using a computer readable medium. Examples of the computer readable medium include magnetic storage media (e.g., ROM, floppy disks, hard disks, etc.), and optical recording media (e.g., CD-ROMs, DVDs, etc.). The program stored on a computer readable medium can also be distributed over network coupled computer systems so that the computer readable code is stored and executed in a distributed fashion.

While there have been illustrated and described what are considered to be example embodiments of the present invention, it will be understood by those skilled in the art and as technology develops that various changes and modification may be made, and equivalents may be substituted for elements thereof without departing from the spirit and scope of the present invention. Many modifications may be made to adapt the teachings of the present invention to a particular situation without departing from the scope thereof. For example, many computer readable media or data storage devices may be utilized, as long as reference signals are recorded thereon to reflect optimum recording conditions. In addition, text-based subtitle data can also be configured differently as shown in FIG. 3 or FIG. 7. Similarly, the CPU can be implemented as a chipset having firmware, or alternatively, a general or special purposed computer programmed to perform the methods as described with reference to FIG. 2 and FIG. 9. Accordingly, it is intended, therefore, that the present invention not be limited to the various example embodiments disclosed, but that the present invention includes all embodiments falling within the scope of the appended claims.

What is claimed is:

1. A method of reproducing multimedia image data and text-based subtitle data recorded on a computer readable storage medium for displaying subtitles on an image based on the multimedia image data, the method comprising:

reading text-based subtitle data including dialog information and style set, the dialog information comprising text information, reference style information and partial style information, and the style set comprising a plurality of style information and information indicating whether to permit predetermined style information, which is separate from the style information defined by a manufacturer of the computer readable storage medium, to be applied to the dialog information; and applying one style information of the plurality of style information to the text information, using the reference style information indicating one style information which is to be applied to the text information among the plurality of style information, and applying the partial style information to a portion of the text information.

2. The method as claimed in claim 1, wherein the style information includes area information indicating a position at which the text information is displayed and font information regarding a size and a color of a font of the text information.

3. The method as claimed in claim 1, wherein the dialog information includes information indicating the time when the text information is output and the time when the output of the text information is finished.

* * * * *